(12) United States Patent
Tsai

(10) Patent No.: US 9,765,868 B1
(45) Date of Patent: Sep. 19, 2017

(54) SHAFT CIRCULATION BALL SCREW

(71) Applicant: HIWIN TECHNOLOGIES CORP., Taichung (TW)

(72) Inventor: Shang-Hua Tsai, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 15/060,287

(22) Filed: Mar. 3, 2016

(51) Int. Cl.
*F16H 21/10* (2006.01)
*F16H 25/22* (2006.01)

(52) U.S. Cl.
CPC .................. *F16H 25/2228* (2013.01)

(58) Field of Classification Search
CPC ......... F16H 25/2214; F16H 2025/2242; F16H 25/2233; F16H 25/2228
See application file for complete search history.

(56) References Cited

U.S. PATENT DOCUMENTS

| 7,051,610 | B2 * | 5/2006 | Stoianovici | ............. F16H 1/163 |
| | | | | 384/45 |
| 7,249,533 | B2 * | 7/2007 | Inoue | .................. F16H 25/2204 |
| | | | | 74/424.82 |
| 7,305,902 | B2 * | 12/2007 | Inoue | .................. F16H 25/2233 |
| | | | | 74/424.85 |
| 2015/0362050 | A1 * | 12/2015 | Kuo | .................... F16H 25/2214 |
| | | | | 74/424.85 |

FOREIGN PATENT DOCUMENTS

JP        2010090953 A     4/2010

* cited by examiner

*Primary Examiner* — Zakaria Elahmadi
(74) *Attorney, Agent, or Firm* — Wang Law Firm, Inc.

(57) ABSTRACT

A shaft circulation ball screw includes: a screw, a nut, a circulation member, and two fixing rings. The screw is provided with a stop portion for the two ends of the circulation member to rest against, a distance from the stop portion to a central axis of the screw is defined as a first height H, a distance from a highest point of the rolling elements which are located in the return passage to the central axis of the screw is defined as a second height Hmax, and Hmax satisfies the following relation: Hmax−0.5×BD ≤H≤Hmax.

2 Claims, 5 Drawing Sheets

SHAFT CIRCULATION BALL SCREW

BACKGROUND

Field of the Invention

The present invention relates to a ball screw, and more particularly to a shaft circulation ball screw.

Related Prior Art

Ball screws can generally be classified into inner circulation type and outer circulation type ball screw based on their ways of circulation. The choice of inner or outer circulation is decided by the load requirement of the ball screw. However, no matter the type of the circulation, ball screws are provided for circulation of the balls.

As shown in FIG. 1, which shows a ball screw disclosed in Japan Publication No. 2010-090953, wherein the circulation path 1 of the ball screw only spans a single pitch (between two neighboring threads 1a and 1b). Therefore, when a low lead [low lead means that the interval of the load path (which consists of the helical groove of the screw and the helical groove of the nut) is small, namely, the thickness of the thread between two neighboring helical grooves along the axis of the screw is relatively small] is close to the diameter of the rolling elements 2, which will not only negatively affect the circulation of the rolling elements 2, but also will increase manufacturing difficulties. Besides, collision or mutual rubbing between the rolling elements 2 is likely to occur when the rolling elements 2 circulate through the nut helical groove or the screw helical groove, which will affect the life of the ball screw.

Referring to FIG. 2, a conventional ball screw of another circulation type is shown, and comprises a return passage 4 disposed in the surface of the screw 3 and in communication with the screw helical groove. The return passage 4 spans several pitches 5, above the return passage 4 is provided a return member (not shown), and above the return member is a threaded groove (not shown). The return passage 4 allows the rolling elements 2 to roll through the threaded groove and to return through the return passage 4. However, there is no any guiding structure at the entrance 6 of the return passage 4, which makes it difficult for the rolling elements 2 to enter into the return passage 4.

The present invention has arisen to mitigate and/or obviate the afore-described disadvantages.

SUMMARY

The present invention is aimed at providing a shaft circulation ball screw, which is capable of preventing the problem that the thickness of the circulation member will become too thin when the stop portion is higher than the second height, and the structure strength of the screw will be reduced when the stop portion is lower than Hmax−0.5×BD.

Therefore, a shaft circulation ball screw in accordance with the present invention comprises: a screw, a nut, a circulation member, and two fixing rings. The screw is provided with a stop portion for the two ends of the circulation member to rest against, a distance from the stop portion to a central axis of the screw is defined as a first height H, a distance from a highest point of the rolling elements which are located in the return passage to the central axis of the screw is defined as a second height Hmax, and Hmax satisfies the following relation: Hmax−0.5×BD≤H≤Hmax.

Preferably, the return passage includes a guide portion for guiding the rolling elements into the return passage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
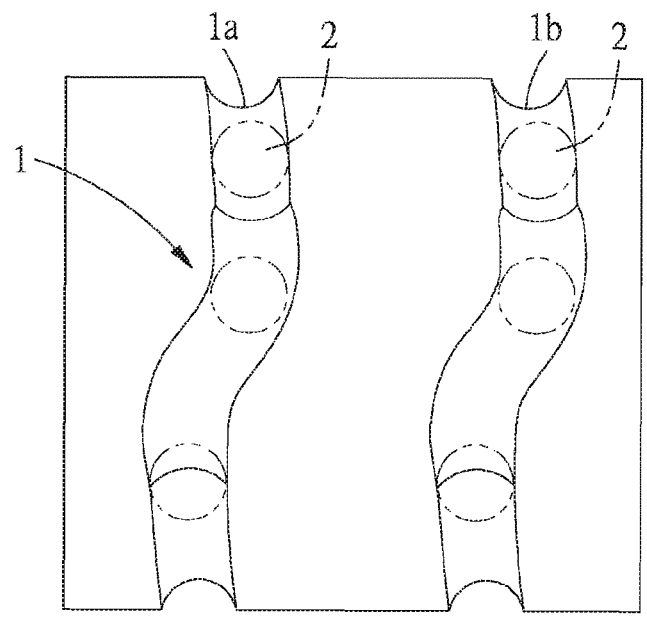
FIG. 1 shows a conventional ball screw disclosed in Japan Patent No. 2010-090953.
Figure 2:
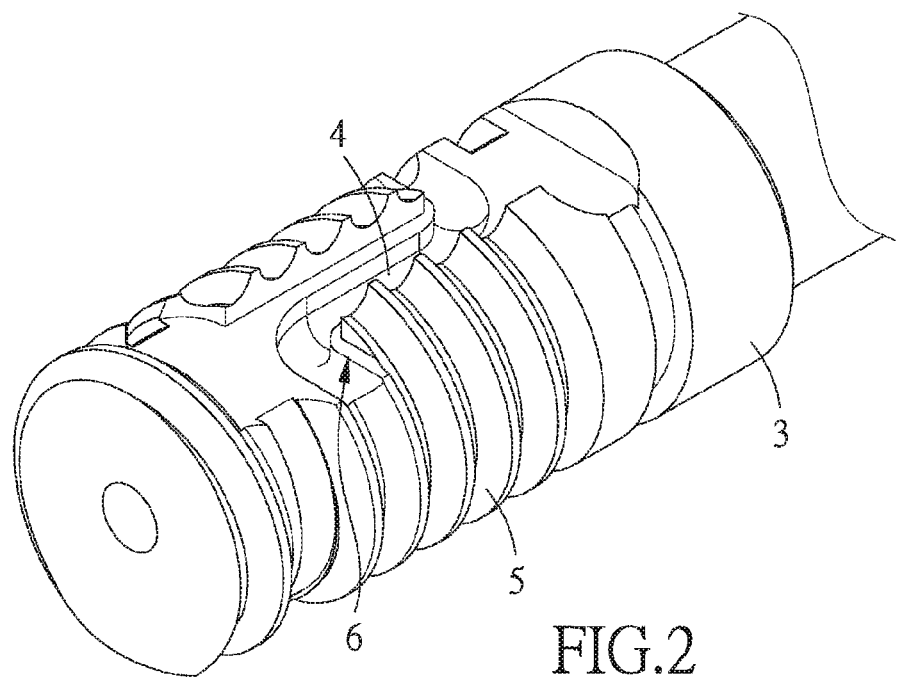
FIG. 2 shows another conventional ball screw.
Figure 3:
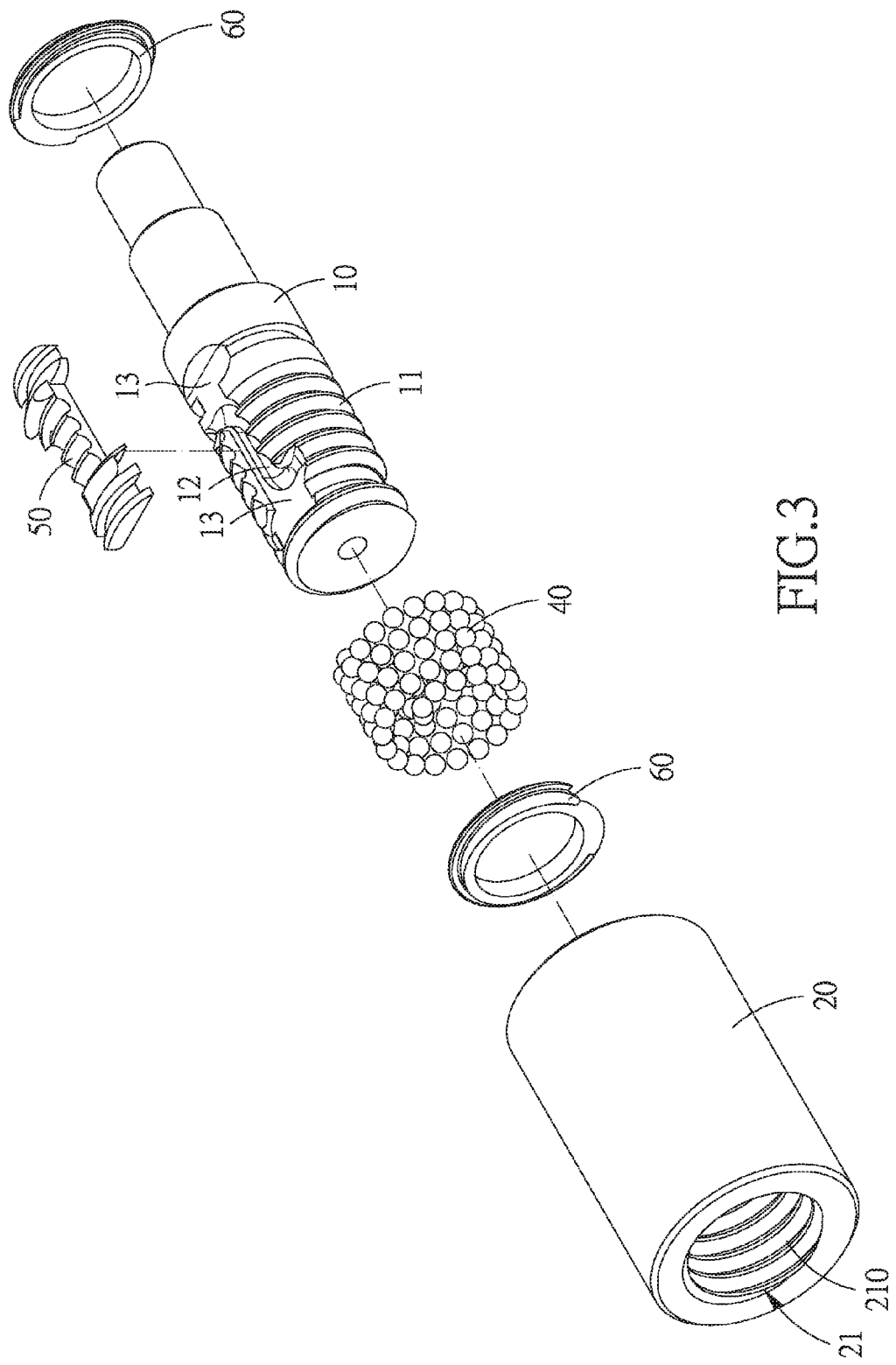
FIG. 3 is an exploded view of a shaft circulation ball screw in accordance with a preferred embodiment of the present invention.
Figure 5:
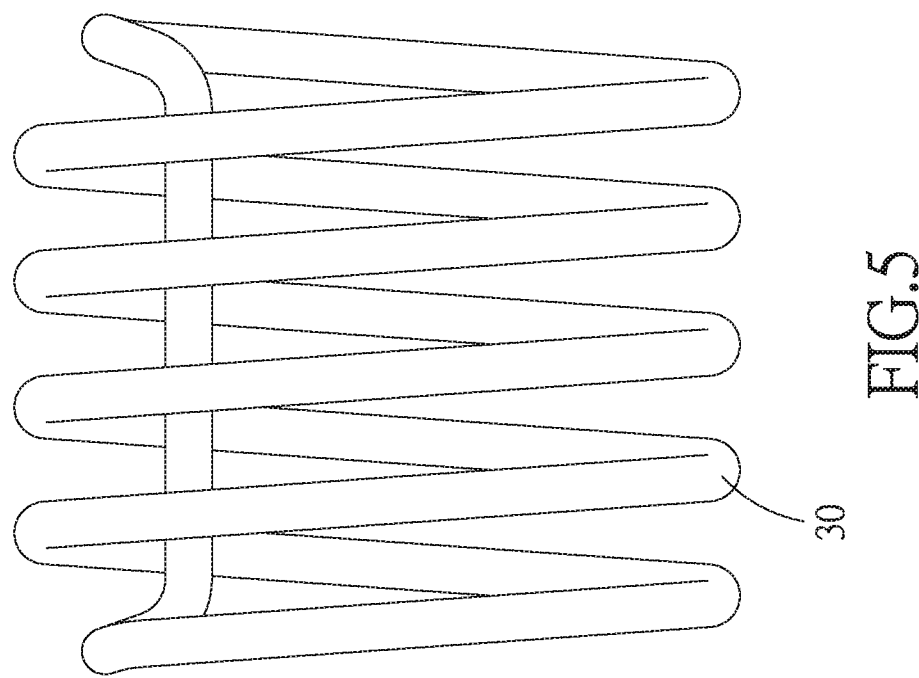
FIG. 5 is another illustrative view of the load path and the return path of the shaft circulation ball screw in accordance with the preferred embodiment of the present invention.
Figure 4:
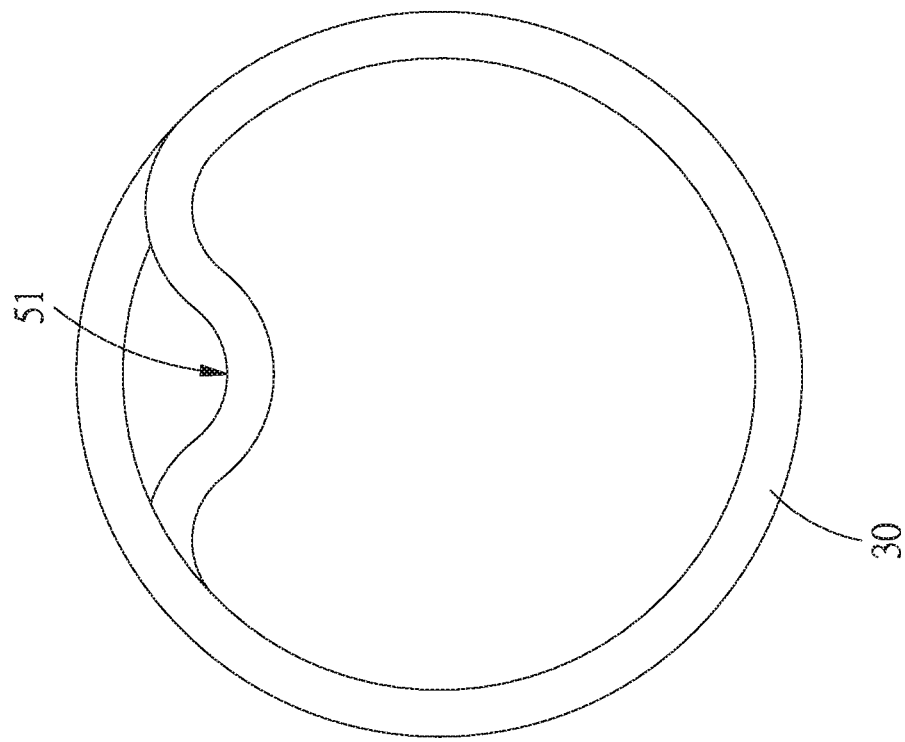
FIG. 4 is an illustrative view of the load path and the return path of the shaft circulation ball screw in accordance with the preferred embodiment of the present invention.
Figure 6:
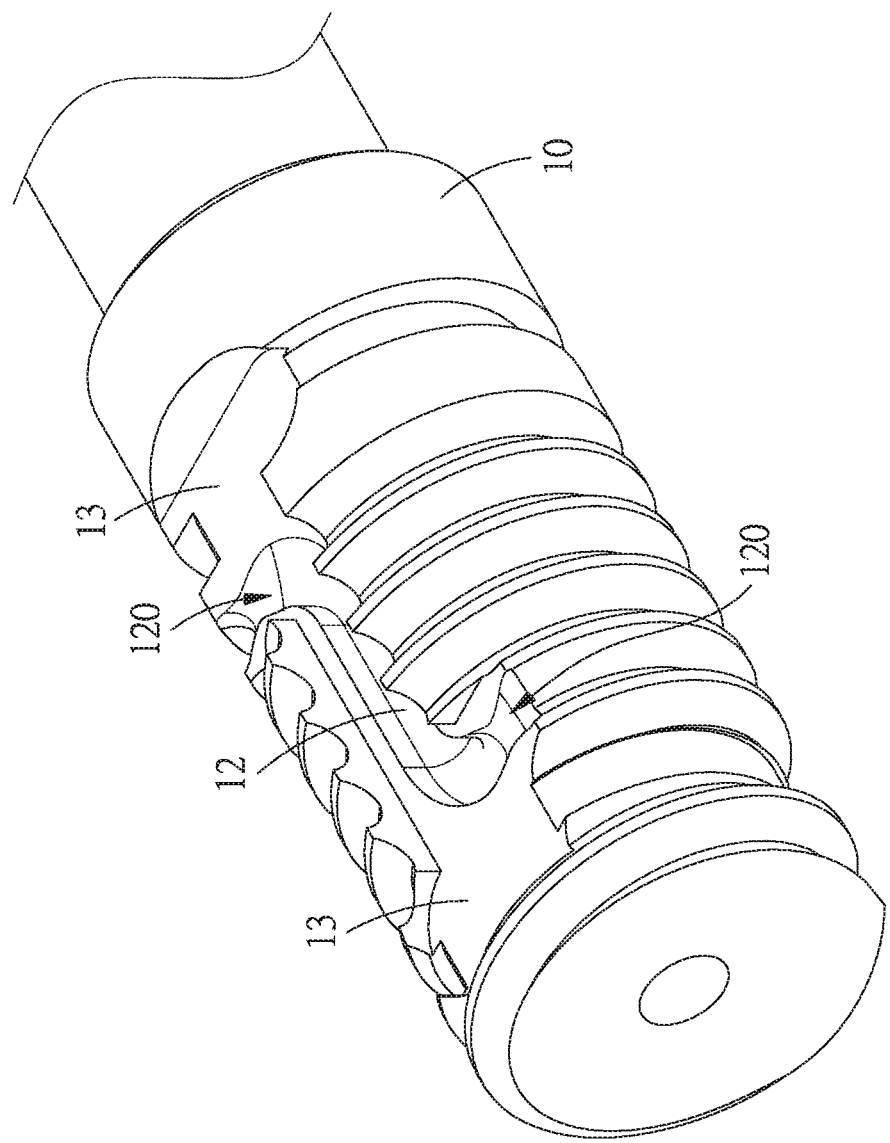
FIG. 6 is a perspective view of the shaft circulation ball screw in accordance with the preferred embodiment of the present invention.
Figure 7:
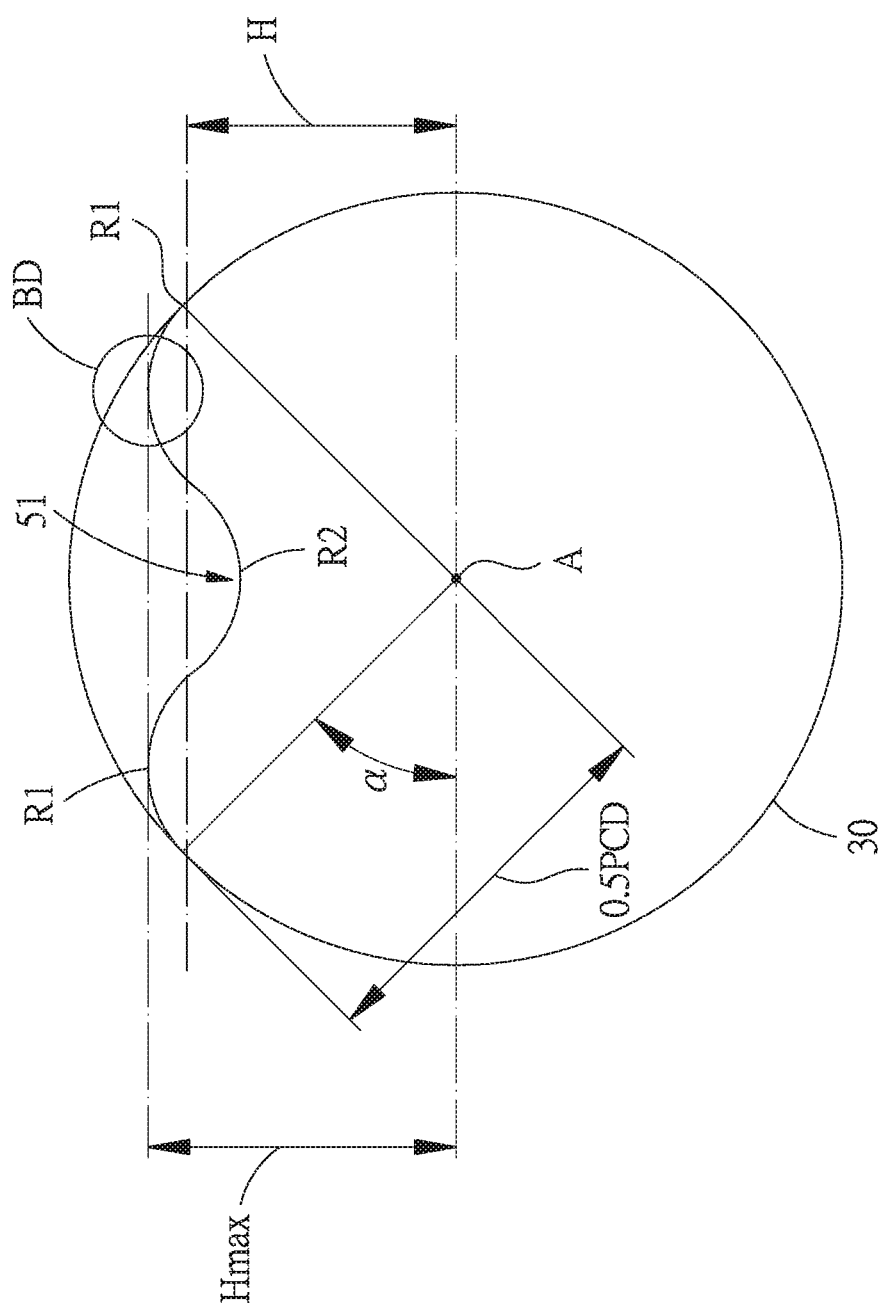
FIG. 7 is an illustrative view showing the projection of the load path and return path onto the ball screw of the present invention.

Referring to FIGS. 3-7, a shaft circulation ball screw in accordance with a preferred embodiment of the present invention comprises: a screw 10, a nut 20, a circulation member 50, and two fixing rings 60.

The screw 10 is provided with a screw helical groove 11 and a return passage 12. The return passage 12 includes a guide portion 120.

The nut 20 is provided with an insertion hole 21 for insertion of the screw 10, and a nut helical groove 210 is formed on an inner surface of the insertion hole 21 to cooperate with the screw helical groove 11 to form a load path 30.

The circulation member 50 is connected between two ends of the load path 30 for circulation of a plurality of rolling elements 40 and cooperates with the screw 10 to form a return path 51.

The fixing rings 60 are used to fix two ends of the circulation member 50 to the screw 10.

The screw 10 is provided with a stop portion 13 for the two ends of the circulation member 50 to rest against. A distance from the stop portion 13 to a central axis A of the screw 10 is defined as a first height H, a distance from a highest point of the rolling elements 40 which are located in the return passage 12 to the central axis A of the screw 10 is defined as a second height Hmax, and Hmax satisfies the following relations:

$$H\mathrm{max} = R1 + (0.5 \times PCD - R1) \times \sin\alpha;$$

$$H\mathrm{max} - 0.5 \times BD \le H \le H\mathrm{max};$$

$$R1+(0.5 \times PCD-R1) \times \sin \alpha - 0.5 \times BD \leq H \leq R1+(0.5 \times PCD-R1) \times \sin \alpha;$$

R1: a first return radius of curvature R2: a second return radius of curvature, PCD: pitch diameter, BD: diameter of the rolling elements α: lead angle.

In this embodiment, when R1=R2=8, PCD=33, BD=6.35, and α=45, then the resulted value of Hmax is 14.01 by plugging these parameters into the equation of Hmax=R1+(0.5×PCD−R1)×sin α.

In this embodiment, the stop portion 13 satisfies the following relation: Hmax−0.5×BD≤H≤Hmax. Therefore, when Hmax is 14.01 and substituted into the relation, 10.48≤H≤14.01 will be obtained.

In this embodiment, the reason why the stop portion 13 must satisfy the relation of Hmax−0.5×BD≤H≤Hmax is because: the stop portion 13 of the screw 10 is provided for mounting or fixing of the two ends of the circulation member 50. If the stop portion 13 is higher than the second height Hmax (the distance from the highest point of the rolling elements 40 within the return passage 12 to the central axis A of the screw 10), the thickness of the circulation member 50 will be too thin and cause damage to the circulation member 50.

If the stop portion 13 is lower than Hmax−0.5×BD, it will reduce the structural strength and rigidity of the screw 10. Therefore, only when the stop portion 13 meets the relation of Hmax−0.5×BD≤H≤Hmax, the thickness of the circulation member 50 and the structural strength of the screw 10 will not be negatively influenced.

Besides, the return passage 12 is provided with the guide portion 120, which ensures that the rolling elements 40 can be guided by the guide portion 120 and enters the return passage 12 smoothly.

While we have shown and described various embodiments in accordance with the present invention, it is clear to those skilled in the art that further embodiments may be made without departing from the scope of the present invention.

What is claimed is:

1. A shaft circulation ball screw, comprising:
   a screw provided with a screw helical groove and a return passage;
   a nut provided with an insertion hole for insertion of the screw, a nut helical groove being formed on an inner surface of the insertion hole to cooperate with the screw helical groove to form a load path for accommodation of a plurality of rolling elements; and
   a circulation member connected between two ends of the load path for circulation of the rolling elements and cooperating with the screw to form a return path;
   wherein the screw is provided with a stop portion for the two ends of the circulation member to rest against, a distance from the stop portion to a central axis of the screw is defined as a first height H, a distance from a highest point of the rolling elements which are located in the return passage to the central axis of the screw is defined as a second height Hmax, and Hmax satisfies the following relations:

$$H\text{max}-0.5 \times BD \leq H \leq \text{max};$$

$$H\text{max}=R1+(0.5 \times PCD-R1) \times \sin \alpha;$$

$$H\text{max}-0.5 \times BD \leq H \leq \text{max}; \text{ and}$$

$$R1+(0.5 \times PCD-R1) \times \sin \alpha - 0.5 \times BD \leq H \leq R1+(0.5 \times PCD-R1) \times \sin \alpha;$$

R1 is a first return radius of curvature;
   R2 is a second return radius of curvature;
   PCD is a pitch diameter;
   BD is a diameter of the rolling elements;
   α is a lead angle.

2. The shaft circulation ball screw as claimed in claim 1, wherein the return passage includes a guide portion for guiding the rolling elements into the return passage.

* * * * *